United States Patent [19]
Dick

[11] 4,006,597
[45] Feb. 8, 1977

[54] METHOD FOR MICROWAVE TRANSMISSION OF ENERGY WITH SUPERCONDUCTING APPARATUS

[75] Inventor: G. John Dick, Pasadena, Calif.
[73] Assignee: The United States of America as represented by the Secretary of the Navy, Washington, D.C.
[22] Filed: June 3, 1976
[21] Appl. No.: 692,401

Related U.S. Application Data

[62] Division of Ser. No. 606,160, Aug. 20, 1975, Pat. No. 3,983,470.
[52] U.S. Cl. ................................................. 60/721
[51] Int. Cl.[2] .......................................... F03G 7/00
[58] Field of Search .................................... 60/721
[56] References Cited
UNITED STATES PATENTS
3,732,692    5/1973    Norell ............................. 60/670 X

Primary Examiner—Allen M. Ostrager
Attorney, Agent, or Firm—R. S. Sciascia; Charles D. B. Curry; James M. Skorich

[57] ABSTRACT

A superconducting microwave engine that achieves mechanical to microwave energy conversion or microwave to mechanical energy conversion. Such is accomplished by employing a superconducting resonator to increase the decay time of the microwaves inside the resonator and thereby provide the resonator with sufficient time to adiabatically deform and change its eigenfrequency so as to effect a change in the frequency and corresponding energy state of such microwaves in accordance with the Boltzmann-Ehrenfest Theorm. This invention may be in the form of a cylindrical cavity and piston combination, a cavity and vibrating diaphragm combination, or a cylindrical cavity and concentric rotor combination.

4 Claims, 18 Drawing Figures

FIG_1

FIG_1A

FIG_1B

FIG_2

FIG_2A

FIG_2B

FIG_2C

ROTOR 61 IN POSITION A

FIG_3

ROTOR 61 IN POSITION B

FIG_3A

FIG_3B

FIG_3C

FIG_4B

FIG_4C

FIG_5

4,006,597

METHOD FOR MICROWAVE TRANSMISSION OF ENERGY WITH SUPERCONDUCTING APPARATUS

This application is a division of patent application Ser. No. 606,160 filed Aug. 20, 1975, now U.S. Pat. No. 3,983,470 by G. John Dick.

BACKGROUND OF THE INVENTION

1. Field of the Invention

The present invention relates to an engine and more particularly to a superconducting microwave engine.

2. Description of the Prior Art

The prior art consists essentially of scientific principles and theorms which heretofore defied operational application because of difficulties encountered in structuring a design which could overcome the physical constraints inherent in such principles and theorms. The most significant area of difficulty lay in constructing a resonator (or deformable cavity) in which the frequencies of the microwaves contained therein could be changed without significant energy loss or decay.

The present invention applies the principles of superconductivity to the design and construction of a resonator to appreciably increase the decay time of the microwaves contained therein and thereby overcome the aforementioned difficulties and make the efficient operation of a microwave engine feasible.

SUMMARY OF THE INVENTION

The invention is an engine that converts work into high frequency microwaves or, conversely, high frequency microwaves into work. This is accomplished through the use of a cavity with deformable walls, or resonator, which has superconducting properties. That is, by using special materials and keeping the walls at an extraordinarily low temperature, the walls' internal resistance is substantially reduced and, concomitantly, the microwaves inside the cavity are not absorbed by the walls upon impact as quickly as would normally be the case. Consequently, their decay time is significantly increased enabling the cavity to be deformed from a shape corresponding to one specific eigenfrequency to another before significant dissipation of the microwave energy through absorption by the walls has occured. High frequency microwaves are generated by the compression of such a superconducting cavity containing low frequency microwaves into a high eigenfrequency shape by mechanical work, and are subsequently coupled out of the cavity at an appropriate point in the cycle. Work is generated by the expansion of cavity walls caused by the injection of high frequency microwaves into such a superconducting cavity when it is in a compressed, high eigenfrequency shape.

The various physical forms the invention may take correspond essentially to different means for effecting a rapid cyclic deformation of the cavity from one shape to another and, completing the cycle, back to the original shape. Those combinations set out herein are examples of such means.

STATEMENT OF THE OBJECTS OF THE INVENTION

An object of the present invention is to use a superconducting resonator to convert low frequency microwaves into a larger amount of microwave energy at a higher frequency.

Another object of the present invention is to use a superconducting resonator to generate work through the conversion of high frequency microwave energy into a lesser amount at a lower frequency.

A further object of the present invention is to provide an efficient method of energy transmission.

Other objects, advantages and novel features of the invention will become apparent from the following detailed description of the invention when considered in conjunction with the accompanying drawings.

DESCRIPTION OF THE PREFERRED EMBODIMENT

It is well known that magnetic fields cause forces, the pressure produced by a magnetic field B being given by the expression $B^2/2\mu_o$. Oscillating magnetic fields are also known to cause forces of the same type. Assuming that the radiation of a magnetic field were contained in an ideal resonator (a deformable cavity) with perfectly flexible walls, a counter balancing force on the walls of the same magnitude would be required to preserve equilibrium. However, if the external force on the walls of such an ideal resonator was increased slightly the volume of the resonator would contract and mechanical work would be done on the electromagnetic fields contained therein. This work would cause an increase in the stored electromagnetic energy.

The particular form taken by the energy in such a resonator is described by the Boltzman-Ehrenfest Theorem. This theorem states that if the deformation is slow enough only one mode will continue to be excited, and the energy contained in that mode will be given by the equation $E = N\hbar w(X)$ where $N$ = the number of photons in the cavity, $\hbar = h/2$ and $h$ is the Planck constant, and $w(X)$ = the instantaneous eigenfrequency of the cavity deformed in some manner with $X$ being the parameter of deformation.

If the time for decay of the microwave energy into heat in the walls of the cavity is much longer than the time required for the deformation of the cavity, it is possible to inject energy into the cavity at one frequency and, after deformation, extract a different amount of energy at a different frequency, that is, the eigenfrequency corresponding to the latter configuration of the cavity. If the final frequency is higher than the original frequency injected into the cavity, the engine will have generated energy in microwave form. The difference between the microwave energy originally injected and the final state of microwave energy will be the mechanical work performed by the walls of the cavity against the radiation pressure of the electromagnetic fields inside the cavity required to deform the cavity and thereby change its eigenfrequency.

Where the final frequency is lower than the initial frequency, then the engine will have generated mechanical power. The difference between the input and output energies will be work performed by radiation pressure of the electromagnetic fields in deforming the cavity walls.

For practical operation, the engine of the present invention will operate cyclically, that is, (1) the injection of microwaves of a relatively low frequency, (2) the deformation of the cavity through the application of work, (3) the transfer of the microwaves of the resultant higher frequency out of the cavity, and (4) the deformation of the cavity back to its original configuration. This constitutes one complete cycle for the mode of operation to generate microwave energy from work. To generate work from high frequency microwave energy, the operative cycle consists of (1) the injection of microwaves of a relatively high frequency, (2) the deformation of the cavity caused by the radiation pressure of the electromagnetic fields and the derivation of useful work from such deformation, (3) the exhaust of microwaves of the resultant lower frequency from the cavity, and (4) the deformation of the cavity back to its original configuration.

In order to effectively function, two conditions must be met: (1) the frequency of the cyclic cavity deformation must be low relative to the electromagnetic frequency, $\gamma$; and (2) since any real resonator or cavity has losses, the electromagnetic energy must not decay significantly into heat during the time required for the deformation, that is, one-half of the time required to complete a mechanical cycle.

The first condition is that the cavity deformation must be adiabatic, that is, the time required for deformation must be longer than the time for one microwave cycle, $1/\gamma$. For mechanical frequencies currently attainable it is impossible to violate this condition.

The second condition is that the microwave energy must not dissipate significantly during the time required for mechanical deformation of the cavity. With any normal material this is an impossible requirement, but through the application of the principles of superconductivity to the design and construction of a resonator this condition may be satisfied, and such application forms the basis for the operational feasibility of the present invention.

Figure 1:
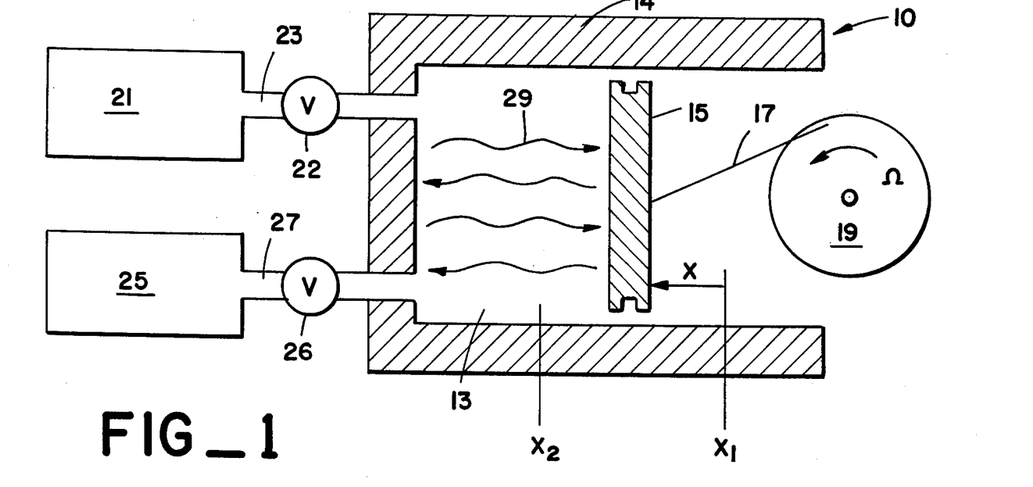
FIG. 1 is a schematic diagram of the piston and cylindrical cavity combination embodiment of the superconducting microwave engine of the present invention.

Referring to FIG. 1, engine 10 is an embodiment of the present invention in the form of a cylindrical cavity and piston combination. Engine 10 includes deformable cylindrical cavity 13, walls 14, piston 15, rod 17, crankshaft 19, low frequency ($w(X_1)$) microwave source 21, valve 22, port 23, high frequency ($w(X_2)$) microwave load 25, valve 26, port 27, and microwaves 29.

Piston 15 slides within the cavity formed by walls 14. Both walls 14 and piston 15 are superconducting. Deformable cylindrical cavity 13 is formed by walls 14 and the left face of piston 15. Rod 17 is rotatably attached to piston 15 at one end, and rotatably attached to crankshaft 19 at its other end. Port 23 communicates between low frequency microwave source 21 and cavity 13. Valve 22 is located within port 23, and low frequency microwave source 21 communicates with cavity 13 by means of port 23 only when valve 22 is open. Port 27 communicates between high frequency microwave load 25 and cavity 13. Valve 26 is located within port 27, and high frequency microwave load 25 communicates with cavity 13 by means of port 27 only when valve 26 is open. Ports 23 and 27 may be any means known in the art to transfer microwaves efficiently from one volume into another, e.g., a connecting wave guide or a connecting waveguide with a coaxial rod physically penetrating cavity 13.

Figure 1A:
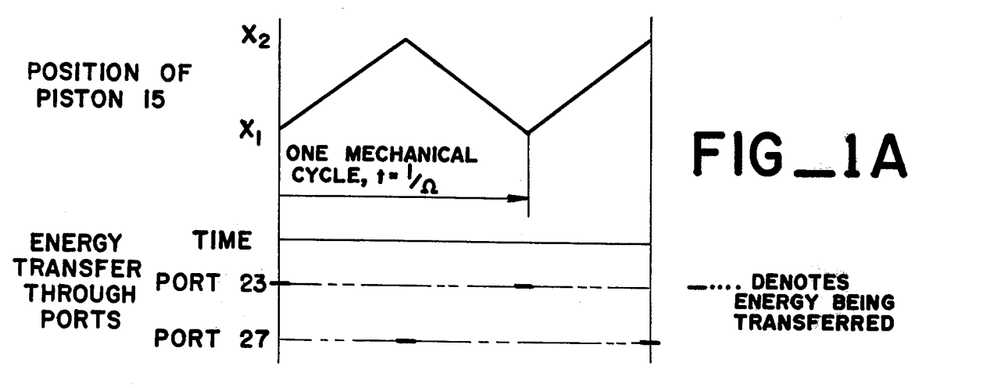
FIGS. 1A and 1B are graphs relating to its operation.
Figure 1B:
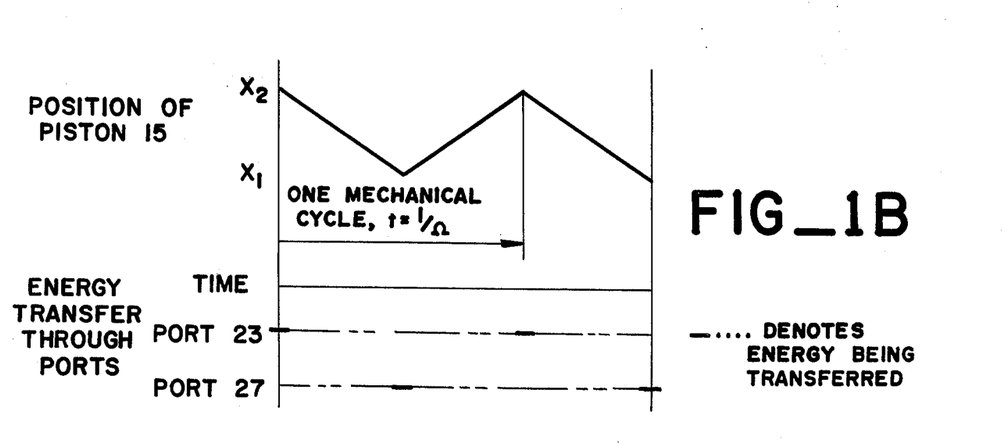

FIG. 1A is a graph schematically showing the position of piston 15 and the energy transfer through port 23 and port 27 with respect to time during the mechanical cycle for engine 10 operating in the mode to generate high frequency microwaves ($w(X_2)$) from work and input low frequency ($w(X_1)$) microwaves. FIG. 1B is a graph schematically showing the position of piston 15 and the energy transfer through port 23 and port 27 with respect to time during the mechanical cycle for engine 10 operating to generate useful work from input high frequency ($w(X_2)$) microwaves (the rectification mode of operation).

Referring to the FIGS. 1, 1A, and 1B, when piston 15 is in position $X_1$ cavity 13 achieves its maximum volume and is in a shape with an eigenfrequency of $w(X_1)$. While piston 15 is in position $X_1$, port 23 is opened by means of valve 22 to allow the passage of microwaves of low frequency $w(X_1)$ from source 21 into cavity 13 and thereby excite the cavity with microwave energy $E_1$ at frequency $w(X_1)$. Port 23 is then closed by means of valve 22 and, as port 27 remains closed during this interval, cavity 13 is effectively sealed. A driving means (not shown) applies mechanical work to crankshaft 19 to cause it to rotate counterclockwise at mechanical frequency $\Omega$. This work is subsequently applied by means of rod 17 to piston 15 to force it to move to the viewer's left and thereby change the configuration of cavity 13. Such translational movement continues until position $X_2$ is realized, at which point cavity 13 achieves its minimum volume and has an eigenfrequency of $w(X_2)$. The change in configuration causes microwaves 29 to undergo an increase in frequency to $w(X_2)$ in accordance with the Boltzmann-Ehrenfest Theorem, and consequently generates a proportional increase in microwave energy stored in cavity 13 to $E_2$, where $$E_2 = \frac{w(X_2)}{w(X_1)} E_1.$$

While in position $X_2$ port 27 is opened by means of valve 26 and microwaves 29 at high frequency $w(X_2)$ are thereby transmitted out of cavity 13 and applied to high frequency microwave load 25. After such evacuation of cavity 13, port 27 is closed by means of valve 26 (port 23 remains closed during the aforementioned interval) and piston 15 is returned by crankshaft 19 to position $X_1$ to complete the engine cycle. In practice, the cycle is rapidly repeated.

Engine 10 may also be used to generate useful work from input high frequency microwaves. In this mode of operation, low frequency microwave source 21 is instead a source of high frequency ($w(X_2)$) microwaves, high frequency microwave load 25 is instead a low frequency ($w(X_1)$) microwave exhaust sink, and the driving means connected to crankshaft 19 is instead a load (not shown). The cycle is begun with piston 15 at position $X_2$. Port 23 is opened by means of valve 22 to allow cavity 13 to become excited with microwave energy $E_2$ at frequency $w(X_2)$ from source 21 and subsequently closed to seal the cavity, as port 27 remains closed throughout this interval. The radiation pressure of microwaves 29 upon the left face of piston 15 forces the piston to undergo translation to position $X_1$. This translational movement causes the clockwise rotation of crankshaft 19, thereby generating useful mechanical work for application to a connected load (not shown).

When piston 15 reaches position $X_1$, the frequency of microwaves 29 is at lowered value $w(X_1)$ as a result of the change in the configuration of cavity 13 in accordance with the Boltzman-Ehrenfest Theorm. While piston 15 is at $X_1$, port 27 is opened by means of valve 26 and microwaves 29 of frequency $w(X_1)$ are exhausted into low frequency microwave exhaust sink 25. Port 27 is subsequently closed by means of valve 26, and, to complete the cycle, piston 15 is returned to initial position $X_2$ by the continued rotational motion of crankshaft 19 applied to piston 15 by rod 17. In operation, the cycle is rapidly repeated.

Figure 2:
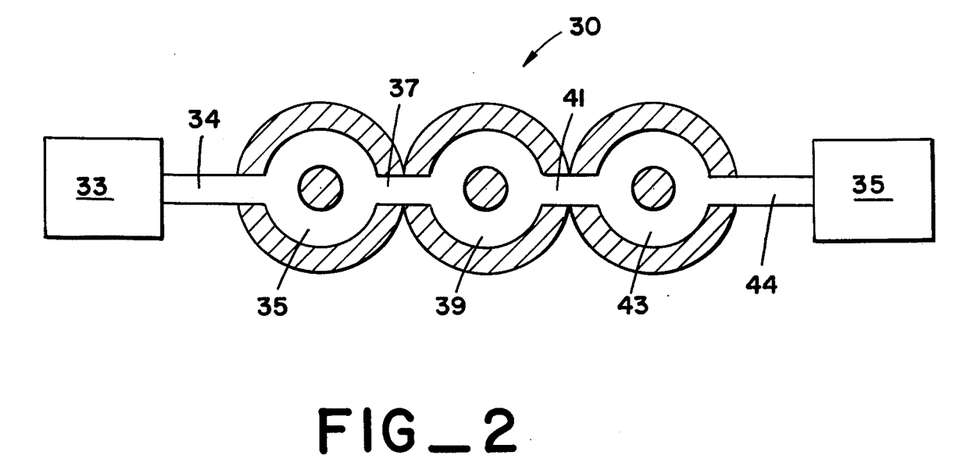
FIGS. 2, 2A, 2B, and 2C are schematic diagrams and graphs illustrating and relating to the vibrating diaphragm and cavity combination embodiment of the superconducting microwave engine of the present invention.
Figure 2A:
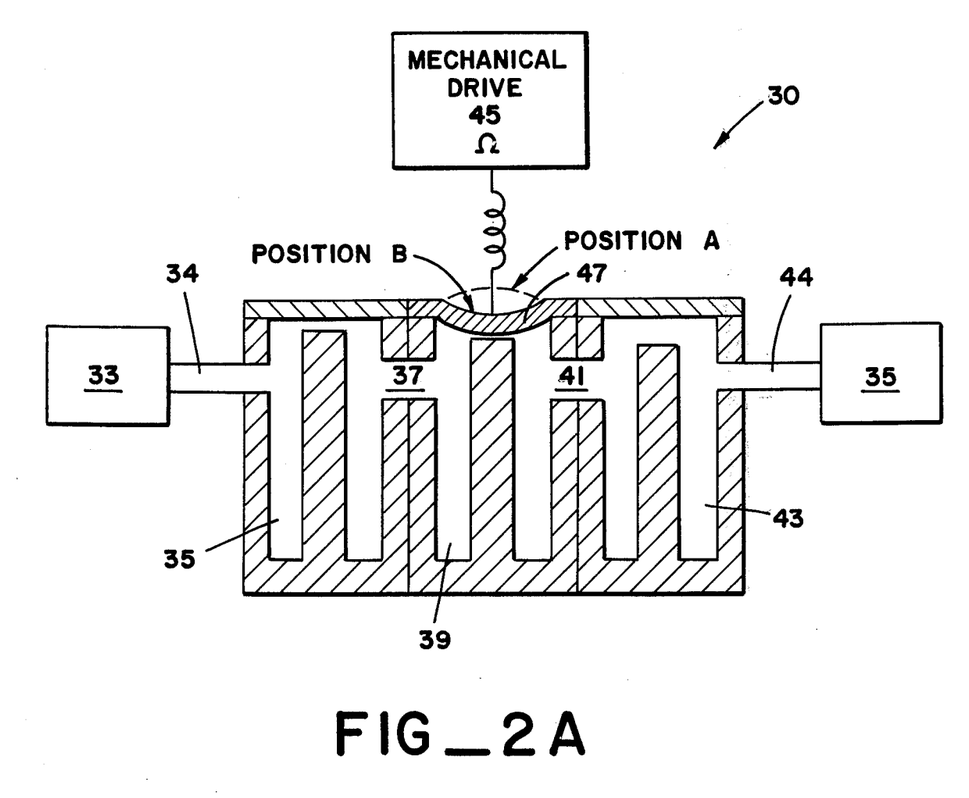

FIGS. 2 and 2A show top and front sectional views, respectively, of engine 30, an embodiment of the present invention in the form of a cavity and vibrating diaphragm combination. Engine 30 includes low frequency ($w(A)$) microwave source 33, fixed configuration cavity 35 having low eigenfrequency $w(A)$, fixed configuration cavity 43 having high eigenfrequency $w(B)$, deformable configuration cavity 39 having a variable eigenfrequency which ranges between $w(A)$ and $w(B)$, and high frequency ($w(B)$) microwave load 35. Diaphragm 47 comprises one wall of deformable cavity 39. Coupling port 34 communicates between low frequency microwave source 33 and fixed configuration cavity 35. Coupling port 37 communicates between fixed configuration cavity 35 and deformable configuration cavity 39. Coupling port 41 communicates between deformable configuration cavity 39 and fixed configuration cavity 43. Coupling port 44 communicates between fixed configuration cavity 43 and high frequency microwave load 35. Cavities 35, 39, and 43, and coupling ports 37 and 41 are all superconducting.

Diaphragm 47 is connected by any means to mechanical drive 45. Diaphragm 47 is free to flex between two extreme positions, position A and position B, and is driven to vibrate between the aforementioned positions at a frequency of $\Omega$ cycles/second by mechanical drive 45. When diaphragm 47 is in position A, deformable configuration cavity 39 has an eigenfrequency of $w(A)$; when diaphragm 47 is in position B, cavity 39 has an eigenfrequency of $w(B)$, where $w(B) > w(A)$.

Figure 2B:
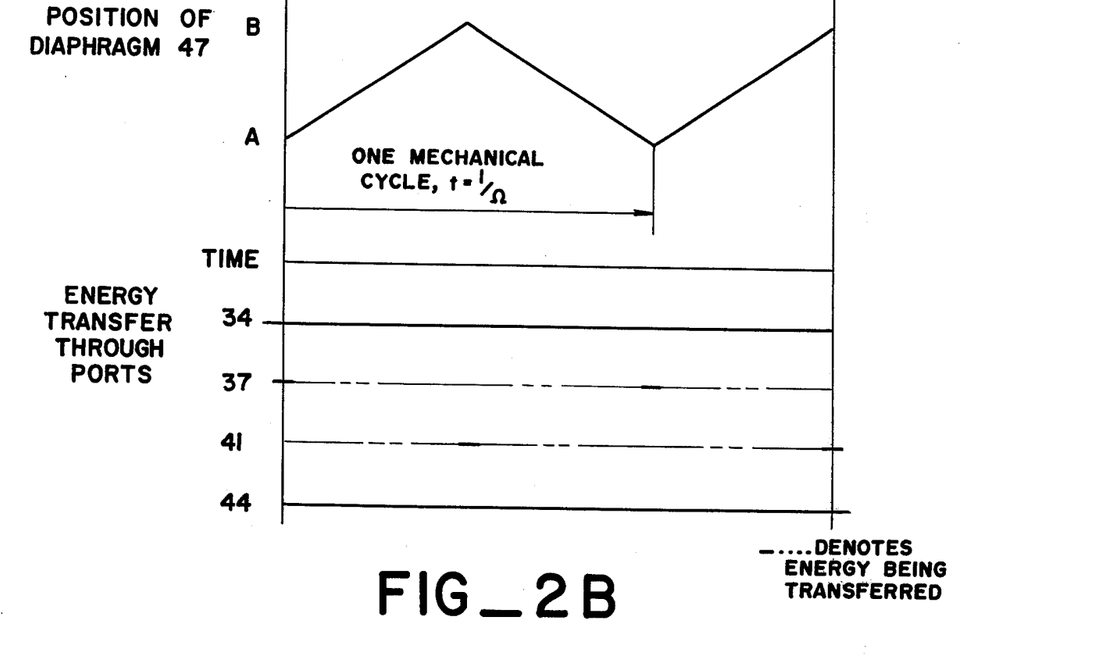
Figure 2C:
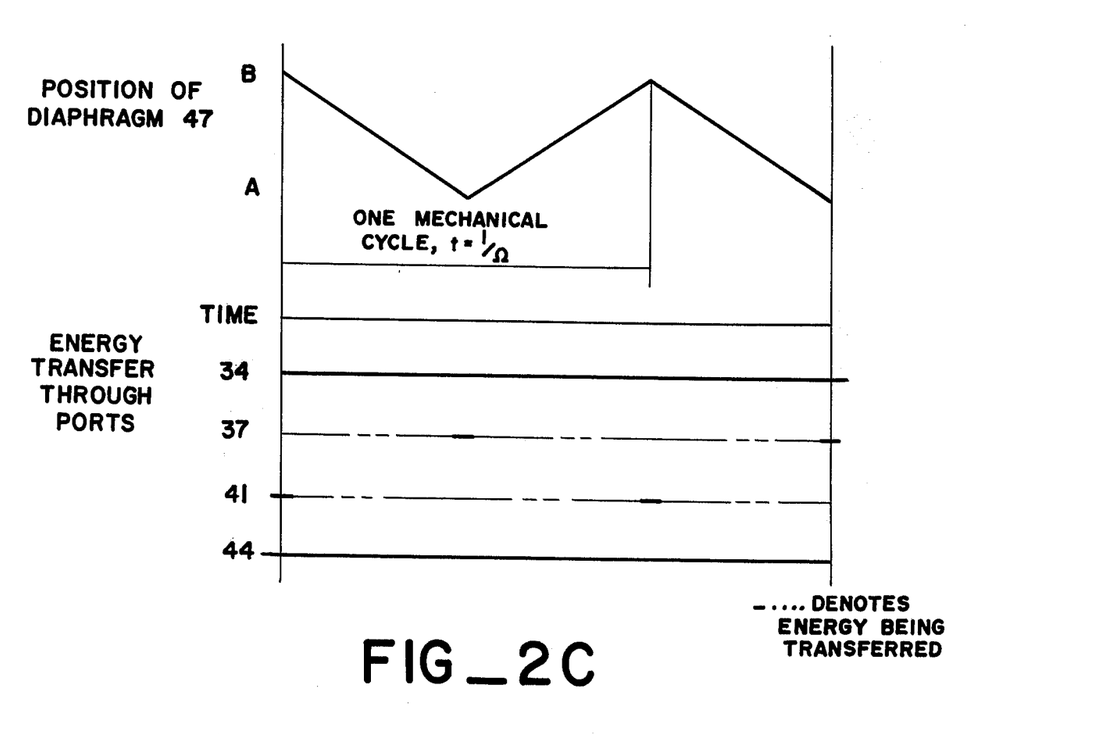

FIG. 2B is a graph schematically showing the position of diaphragm 47 and the energy transfer through each of ports 34, 37, 41, and 44 with respect to time during the mechanical cycle for engine 30 operating in the mode to generate high frequency ($w(B)$) microwaves from work and input low frequency ($w(A)$) microwaves. FIG. 2C is a graph showing the position of diaphragm 47 and the energy transfer through each of ports 34, 37, 41, and 44 with respect to time during the mechanical cycle for engine 30 operating to generate useful work from input high frequency ($w(B)$) microwaves (the rectification mode of operation).

To initiate the mode of operation whereby engine 30 generates high frequency microwaves from low frequency microwaves and work, source 33 excites cavity 35 with low level microwave energy at correspondingly low frequency $w(A)$ by means of coupling port 34. Coupling port 34 remains physically open throughout the operational cycle of engine 30 in order to allow source 33 to continually excite cavity 35 with microwave energy of low frequency $w(A)$.

The electromagnetic coupling of microwaves between two cavities becomes very strong when their respective eigenfrequencies approach equality. Thus, the low frequency microwaves in cavity 35 will couple into deformable configuration cavity 39 through coupling port 37 whenever cavity 39 deforms into a configuration having an eigenfrequency virtually equal to that of fixed cavity 35, that is, $w(A)$. This will occur whenever diaphragm 47 is in position A. Therefore, no means are necessary to alternatively close and open port 37.

The microwaves remain in cavity 39, but are excited to a higher energy level at a correspondingly higher frequency, $w(B)$, in accordance with the Boltzmann-Ehrenfest Theorm by the movement of diaphragm 47 to position B, said movement being accomplished against the radiation pressure of the microwaves contained in cavity 39 by means of work applied by mechanical drive 45. An electromagnetic drive may be substituted for the mechanical drive illustrated in FIG. 2A without loss of effectiveness.

Upon reaching the higher exitation state corresponding to the configuration of cavity 39 associated with diaphragm position B, the microwaves are transferred out of cavity 39 by means of the mechanism of electromagnetic coupling through coupling port 41 to excite cavity 43. This coupling mechanism will operate through coupling port 41 whenever cavity 39 is excited with microwaves of frequency $w(B)$; that is, whenever diaphragm 47 is in position B. No means are necessary to alternatively close and open port 41. The high energy microwaves of frequency $w(B)$ are subsequently coupled from cavity 43 by means of coupling port 44 and applied to high frequency microwave load 35. Coupling port 44 remains physically open throughout the operative cycle of engine 30. Microwaves of frequency $w(B)$ will be coupled through coupling port 44 continuously throughout the operative cycle of engine 30, as shown in FIG. 2B, although the quantitative amount of energy transferred from cavity 43 to load 35 during any discrete interval will vary.

After the high frequency microwaves have been coupled out of cavity 39, the cycle is completed by the return of diaphragm 47 to its initial position A by means of mechanical drive 45. In practice, the cycle described herein is rapidly repeated, e.g., 2000 mechanical cycles per second.

To employ engine 30 to produce mechanical work from high frequency microwaves, load 35 must instead be high frequency ($w(B)$) microwave source 35; low frequency microwave source 33 must instead be low frequency ($w(A)$) microwave exhaust sink 33; and mechanical drive 45 must instead be work load 45.

Assuming the foregoing changes, the cycle is initiated by the excitation of cavity 43 by microwaves of frequency $w(B)$ from source 35 by means of port 44. Cavity 43 is continually excited at such frequency by such means. Such microwaves are then coupled into cavity 39 by means of coupling port 41 when cavity 39 has an eigenfrequency of $w(B)$; that is, when cavity 39 is in the configuration associated with diaphragm position B. The radiation pressure of the high energy microwaves at their correspondingly high frequency, $w(B)$, forces diaphragm 47 to move to position A, and work is thereby generated for application to work load 45.

The movement of the diaphragm towards position A causes the frequency and energy level of the microwaves in cavity 39 to decrease in accordance with the Boltzmann-Ehrenfest Theorm. When position A is reached the microwaves are excited at frequency $w(A)$ and are coupled through coupling port 37 out of cavity 39 to excite cavity 35. The microwaves in cavity 35 are coupled through coupling port 34 into low frequency microwave exhaust sink 33 continuously throughout the operative cycle. Diaphragm 47 is subsequently returned to initial position B to complete the cycle. In practice, the cycle described herein is rapidly repeated.

Figure 3:
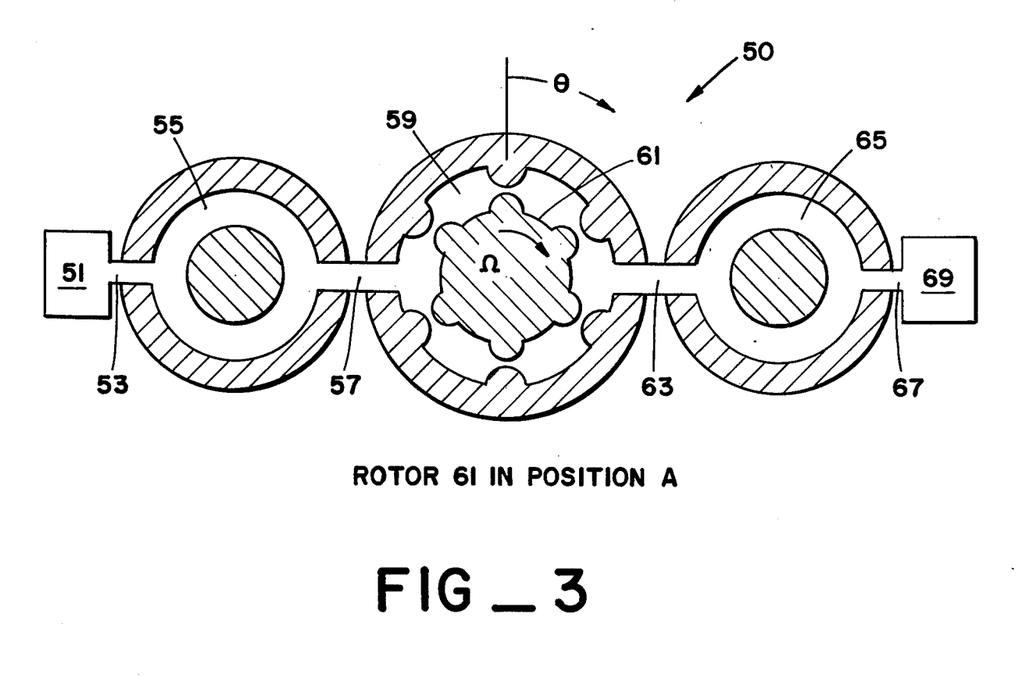
FIGS. 3, 3A, 3B, and 3C are schematic diagrams and graphs showing and relating to the cylindrical cavity and concentric rotor combination embodiment of the superconducting microwave engine of the present invention.
Figure 3A:
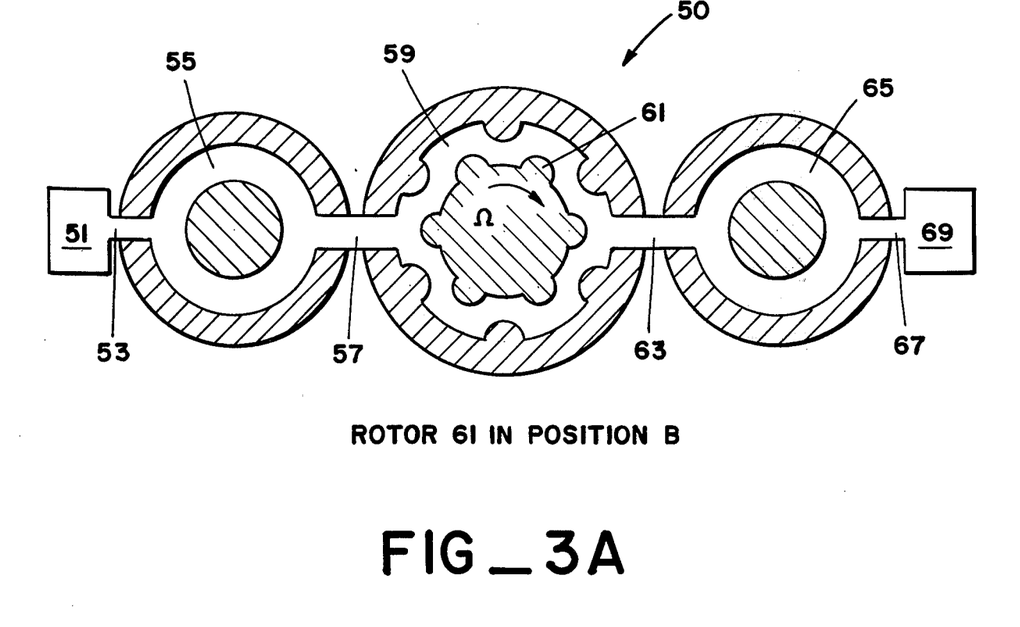

Referring to the sectional views shown in FIGS. 3 and 3A, engine 50 is an embodiment of the present invention in the form of a cylindrical cavity and concentric rotor combination (turbine). Engine 50 includes low frequency ($w(A)$) microwave source 51, fixed configuration cavity 55 having low eigenfrequency $w(A)$, fixed configuration cavity 65 having high eigenfrequency $w(B)$, deformable configuration cavity 59 having a variable eigenfrequency which ranges between $w(A)$ and $w(B)$, and high frequency ($w(B)$) microwave load 69. Concentric rotor 61 is located within deformable configuration cavity 59, and its outer surface forms one wall of the cavity. Coupling port 53 communicates between low frequency microwave source 51 and fixed configuration cavity 55. Coupling port 57 communicates between fixed configuration cavity 55 and deformable configuration cavity 59. Coupling port 63 communicates between deformable configuration cavity 59 and fixed configuration cavity 65. Coupling port 67 communicates between fixed configuration cavity 65 and high frequency microwave load 69. Cavities 55, 59, and 65, and coupling ports 57 and 63 are all superconducting.

Cavity 59 is comprised of six smaller enclaves. This number is used for illustrative purposes. In practice, this embodiment of the invention may have any number of nodes and enclaves greater than one. Regardless of the number of enclaves, the configuration and eigenfrequency of the respective enclaves will be mutually identical at every point in the mechanical cycle of engine 50, that is, for every angular position of rotor 61. Regardless of the number of enclaves, only one port for the transfer of low frequency microwaves into the resonator and one to effect the transfer of high frequency microwaves out of the resonator, e.g., ports 57 and 63, respectively, are necessary because of the high strength of the coupling between the respective enclaves.

Concentric rotor 61 rotates freely about an axis lying along the axis of symmetry of cavity 59. Concentric rotor 61 is rotated in a clockwise direction at a frequency of $\Omega$ revolutions/second by a driving means (not shown). When concentric rotor 61 is in position A, each and every one of the respective enclaves of cavity 59 has an eigenfrequency of $w(A)$; when rotor 61 is in position B, each and every one of the aforementioned enclaves has an eigenfrequency of $w(B)$, where $w(B) > w(A)$.

Figure 3B:
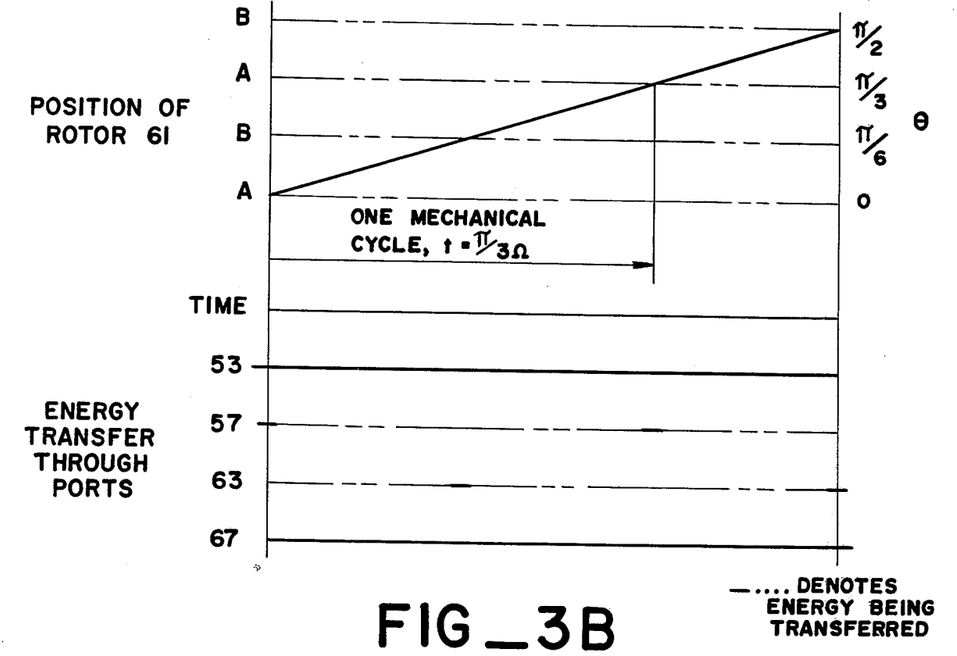

FIG. 3B shows a graph indicating the position of rotor 61 (left vertical axis) and the corresponding angular orientation, $\theta$, of rotor 61 with respect to the datum shown in FIG. 3 (right vertical axis), with both of the foregoing parameters being displayed as a function of time (horizontal axis) during the operation of engine 50 in the mode to generate high frequency ($w(B)$) microwaves from work and low frequency ($w(A)$) microwaves. Directly below this graph is a related graph showing whether energy is being transferred through each of coupling ports 53, 57, 63, and 67 for each point in time on the aforementioned graph of rotor position and $\theta$ versus time.

Figure 3C:
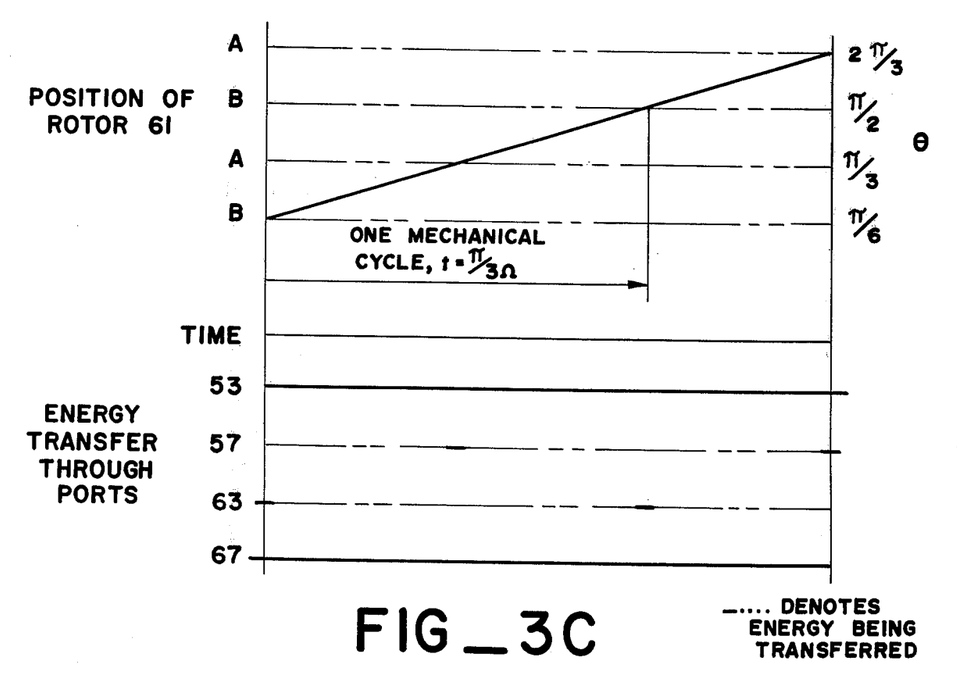

FIG. 3C shows two related graphs illustrating the operational interrelationships of the same parameters in the same manner as set out in FIG. 3B for the operation of engine 50 in the mode to generate useful work from input high frequency ($w(B)$) microwaves (the rectification mode of operation).

To operate engine 50 to produce high frequency microwaves from low frequency microwaves and work, cavity 55 is excited with low frequency microwave energy $E_A$ at frequency $w(A)$ from source 51 by means of coupling through coupling port 53. Cavity 55 remains excited with such energy by such means continually during the operation of the engine.

With rotor 61 initially in position A and $\theta = 0$ (see FIG. 3), each and every one of the enclaves of cavity 59 is in a configuration having an eigenfrequency of $w(A)$, and the mechanism of electromagnetic coupling operates to transfer microwaves of frequency $w(A)$ from cavity 55 into the enclaves of cavity 59 through coupling port 57. Such transfer by means of coupling will operate through port 57 whenever rotor 61 is in position A. No means are necessary to alternatively open and close port 57.

Rotor 61 is subsequently rotated clockwise to position B ($\theta = \pi/6$; see FIG. 3A), increasing the enclaves' eigenfrequency to $w(B)$. The "compression" resulting from this rotation is resisted by reactive electromagnetic forces generated by the microwaves contained in cavity 59, and such forces are overcome by the application of work to rotor 61 by any appropriate means (not shown). In accordance with the Boltzmann-Ehrenfest Theorm, the change in the enclaves' eigenfrequency caused by the rotation of rotor 61 from position A to position B causes an increase in the level of microwave energy contained in the enclaves to $E_B$ at the correspondingly increased frequency $w(B)$, where $$E_B = \frac{w(B)}{w(A)} E_A.$$

While rotor 61 is in position B the high frequency ($w(B)$) microwave energy contained in cavity 59 is transferred into cavity 65 by means of electromagnetic coupling through coupling port 63. Such transfer will occur whenever cavity 59 is excited with microwaves of frequency $w(B)$. No means are necessary to alternatively open and close port 63.

The high frequency microwaves are subsequently applied to microwave load 69 by means of coupling from cavity 65 through port 67. As shown in FIG. 3B, microwaves of frequency $w(B)$ are continuously coupled through coupling port 67 throughout the operative cycle of engine 50, although the quantitative amount of energy transferred during any discrete interval will vary.

After the microwaves of energy $E_B$ have been coupled into cavity 65 from cavity 59, the operative cycle is completed by the continued clockwise rotation of rotor 61 back into starting position A ($\theta = \pi/3$). In practice, the cycle is repeated very rapidly.

In order to use engine 50 to produce work from high frequency microwaves, high frequency microwave load 69 must instead be high frequency ($w(B)$) microwave source 69, low frequency microwave source 51 must instead be low frequency ($w(A)$) microwave exhaust sink 51, and the means for the application of work (not shown) to rotor 61 must instead be a work load connected to rotor 61 by any appropriate means (not shown).

To start the engine, microwaves of high energy $E_B$ at frequency $w(B)$ from source 69 are coupled into cavity 65 by means of coupling port 67. As shown in FIG. 3C, cavity 65 remains excited with such energy by such means continually during the operation of the engine.

With rotor 61 initially in position B and $\theta = \pi/6$, the cavity configuration of maximum eigenfrequency $w(B)$, the microwave energy from cavity 65 is coupled into cavity 59 by means of coupling port 63. The electromagnetic fields generated by the microwaves contained in the enclaves of cavity 59 exert radiation pressure against rotor 61 and force it to rotate clockwise to a position corresponding to a lower enclave eigenfrequency, position A ($\theta = \pi/3$). Any appropriate mechanical means may be used to derive the work done by the electromagnetic fields in rotating rotor 61. The change in the shape of cavity 59 from that associated with position B to that associated with position A results in a lowering of the energy level of the microwaves contained therein from $E_B$ to $E_A$ and a corresponding decrease in frequency from $w(B)$ to $w(A)$ in accordance with the Boltzmann-Ehrenfest Theorm.

When rotor 61 is in position A the microwaves in cavity 59, now at lowered energy level $E_A$ at corresponding lower frequency $w(A)$, are coupled out of cavity 61 to excite cavity 55 by means of coupling port 57. The microwaves are subsequently coupled out of cavity 55 into exhaust sink 51 by means of coupling port 53. The rotation of rotor 61 is continued until position B is again achieved ($\theta = \pi/2$), thereby completing the cycle. In practice, the cycle is rapidly repeated.

The ratio between the eigenfrequencies of the resonator at the extremes of deformation, that is, $w(B)/w(A)$, where $$E_B = \frac{w(B)}{w(A)} E_A,$$

is known as the compression ratio. There is an upper limit on the compression ratio and, therefore, the microwave energy output, $E_B$, attainable with the design illustrated in FIGS. 3 and 3A due to the breakdown of superconductivity that will occur when the critical magnetic field is exceeded as well as the constraint associated with the limiting electric field. As the compression ratio is increased, the operative limit will be approached as relatively large magnetic and electrical fields will be generated by the radical change in configuration of the cavity required to attain the desired compression ratio.

This problem may be overcome by cascading several states of this design (as in conventional turbine design) to achieve further compression and appropriately increase the level of output microwave energy. For example, engine 50 could be cascaded by substituting a deformable configuration cavity of the design of deformable configuration cavity 59 in place of high frequency microwave load 69. The microwaves of energy $E_B$ would be coupled into this second deformable configuration cavity through coupling port 67, where their energy level and corresponding frequency would be increased by a compression cycle identical to that described hereinbefore for deformable configuration cavity 59. The microwaves excited at this increased frequency would then be coupled into a fixed configuration cavity of a matching eigenfrequency, and subsequently coupled to a high frequency microwave load.

It should be noted that the above described one step cascade could be repeated any number of times to achieve virtually any desired high frequency microwave output.

Similarly, one or more deformable configuration cavities operating in the rectification mode and communicating with fixed configuration cavities of appropriately matched eigenfrequencies could be connected in series to engine 50 operating in the rectification mode to increase the useful work derivable from input microwave energy before the exhaust of such microwaves to an exhaust sink.

It is to be understood that although the technique of cascading is explained in reference to the cylindrical cavity and concentric rotor combination embodiment of the present invention, the technique is not limited in applicability to this particular embodiment. Cascading may be used with any embodiment of the present invention to increase the maximum obtainable output frequency or, in the rectification mode, to increase the maximum amount of useful work derivable from an amount of input high frequency microwave energy.

Figure 4:
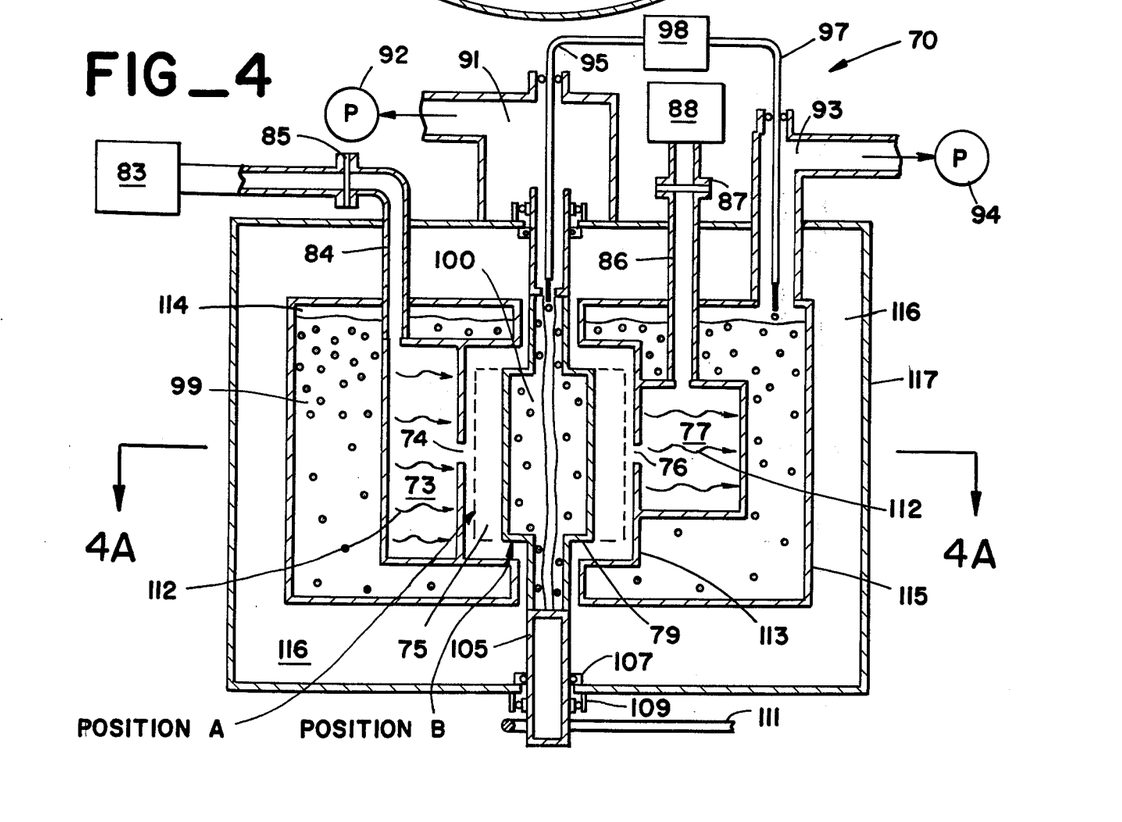
FIG. 4 is an elevational cross section of a detailed version of the cylindrical cavity and concentric rotor combination embodiment of the superconducting microwave engine of the present invention.
Figure 4A:
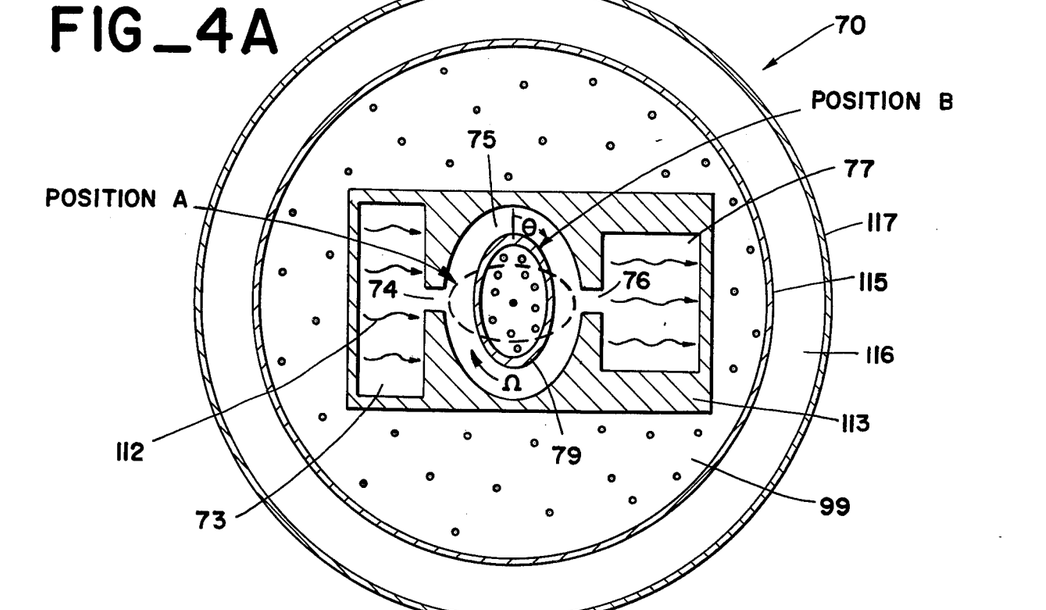
FIG. 4A is a horizontal cross section taken along lines 4A—4A of FIG. 4.

An elevational cross section of a detailed design of an embodiment of the present invention in the form of the cylindrical cavity and concentric rotor combination is illustrated in FIG. 4. FIG. 4A is a horizontal cross section taken along lines 4A—4A of FIG. 4. Engine 70 is basically the turbine design shown in FIGS. 3 and 3A with two enclaves instead of six. Engine 70 includes outer casing 117, inner casing 115, and cavity block 113. Outer casing 117 contains inner casing 115 and cavity block 113. Inner casing 115 contains cavity block 113. Vacuum space 116 is the volume within outer casing 117 surrounding inner casing 115. Volume 114 is the volume within inner casing 115 surrounding cavity block 113.

Cavity block 113 includes fixed configuration cavity 73 having low eigenfrequency $w(A)$, fixed configuration cavity 77 having high eigenfrequency $w(B)$, deformable configuration cavity 75 having a variable eigenfrequency ranging between $w(A)$ and $w(B)$, coupling port 74, and coupling port 76. Coupling port 74 communicates between fixed configuration cavity 73 and deformable configuration cavity 75. Coupling port 76 communicates between deformable configuration cavity 75 and fixed configuration cavity 77.

Rotor 79 is positioned within deformable configuration cavity 75, and has a superconducting outer surface which forms one wall of cavity 75. Rotor 79 is free to rotate about an axis lying along the axis of symmetry of cavity 75. Rotor 79 is driven to rotate clockwise about this axis at a frequency of $\Omega$ revolutions/second by a driving means (not shown) connected to rotor drive belt 111. The rotor assembly also includes insulating support 105, rotating seal 107, and support bearing 109. Rotor 79 has a hollow center filled with liquid helium 100 for the purpose of keeping the outer surface of rotor 79 at a temperature low enough to maintain its superconductive properties. Gaseous helium exhaust line 91 communicates between liquid helium 100 and vacuum pump 92 in order to vent gaseous helium boiled off of the liquid helium 100 by heat generated by the operation of engine 70.

Another purpose is to maintain a pressure upon liquid helium 100 below the ambient value, and thereby keep helium 100 at a proportionally cooler temperature. Vacuum insulated transfer tube 95 communicates between liquid helium source 98 and liquid helium 100 to allow for the replacement of liquid helium 100 which is boiled off by heat generated from the operation of engine 70 with liquid helium from liquid helium source 98.

Volume 114 is almost filled with liquid helium 99 to immerse cavity block 113 in liquid helium 99. Cavity block 113 is immersed in liquid helium 99 for the purpose of keeping the surfaces of cavities 73, 75, and 77 and coupling ports 74 and 76 contained within cavity block 113 at temperatures low enough to maintain their superconductive properties. Gaseous helium exhaust line 93 communicates between volume 114 and vacuum pump 94 in order to vent gaseous helium boiled off of liquid helium 99 by heat generated by the operation of engine 70. A second purpose is to maintain a pressure upon liquid helium 99 below the ambient value, and thereby keep helium 99 at a proportionally cooler temperature. Vacuum insulated transfer tube 97 communicates between volume 114 and liquid helium source 98 in order to allow for the replacement of liquid helium 99 boiled off by heat generated from the operation of engine 70 with liquid helium from liquid helium source 98.

Vacuum space 116 is kept at a vacuum by means of communication (not shown) with a vacuum pump (not shown). The purpose of maintaining this vacuum is to prevent any gas from entering deformable configuration cavity 75 where the presence of such gas would result in sparking and also increase the frictional force opposing the rotation of rotor 79.

Engine 70 also includes low frequency ($w(A)$) microwave source 83, waveguide 84, vacuum window 85, high frequency ($w(B)$) microwave load 88, waveguide 86, vacuum window 87, and microwaves 112. Waveguide 84 communicates between low frequency microwave source 83 and fixed configuration cavity 73. Waveguide 86 communicates between fixed configuration cavity 77 and high frequency microwave load 88.

Vacuum window 85 is positioned in waveguide 84. Vacuum window 87 is positioned in waveguide 86. Both vacuum windows 85 and 87 are permeable to microwaves but not to air. Their purpose is to prevent the leakage of air into the cavities contained in cavity block 113 because such air would condense upon the superconducting surfaces due to their low temperatures (approximately $-268°$ C).

Figure 4B:
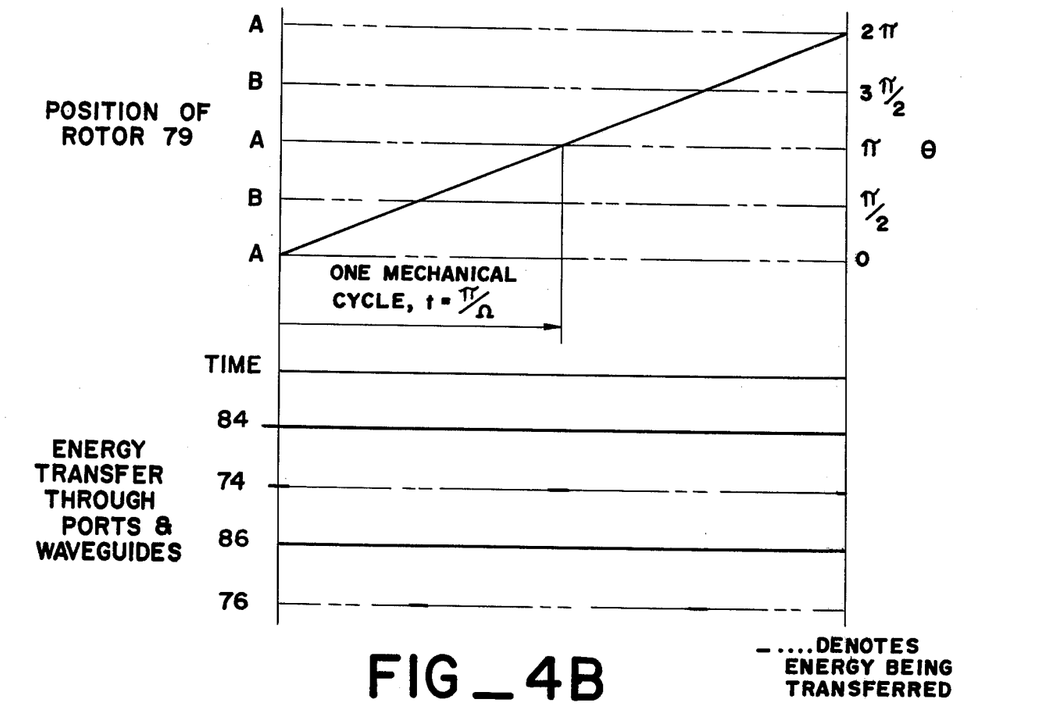
FIGS. 4B and 4C are graphs relating to its operation.

FIG. 4B shows a graph indicating the position of rotor 79 (left vertical axis) and the corresponding angular orientation, $\theta$, of rotor 79 with respect to the datum shown in FIG. 4A (right vertical axis), with both of the foregoing parameters being displayed as a function of time (horizontal axis) during the operation of engine 70 in the mode to generate high frequency ($w(B)$) microwaves from work and low frequency ($w(A)$) microwaves. Directly below this graph is a related graph showing whether energy is being transferred through each of coupling ports 74 and 76 and waveguides 84 and 86 for each point in time on the aforementioned graph of rotor position and $\theta$ versus time.

Figure 4C:
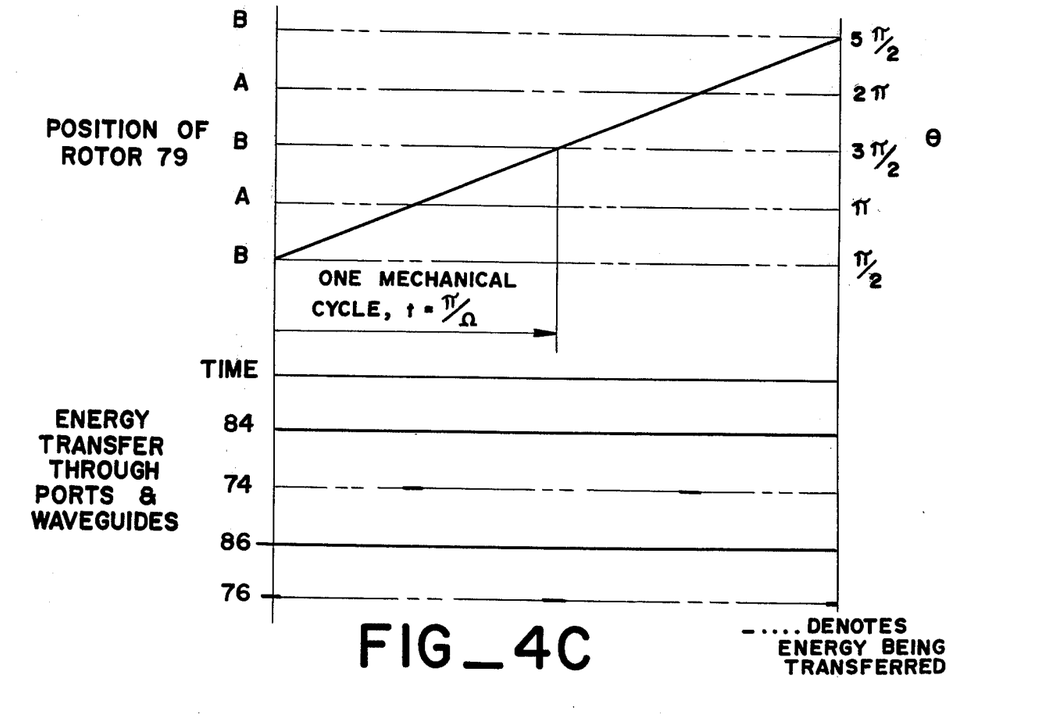

FIG. 4C shows two related graphs illustrating the operational interrelationships of the same parameters in the same manner as set out in FIG. 4B for the operation of engine 70 in the mode to generate useful work from input high frequency ($w(B)$) microwaves (the rectification mode of operation).

To generate high frequency microwave energy from engine 70, cavity 73 is excited with low frequency microwaves of energy $E_A$ at frequency $w(A)$ from source 83 by means of waveguide 84. Cavity 73 is continuously maintained in this state of excitation by such means during the operation of the engine.

With rotor 79 initially in position A and $\theta = 0$, both of the enclaves are in a configuration which has an eigenfrequency of $w(A)$, and microwave energy $E_A$ at frequency $w(A)$ is transferred from cavity 73 into cavity 75 by means of electromagnetic coupling through coupling port 74. This electromagnetic coupling mechanism will operate through port 74 whenever rotor 79 is in position A. No means are necessary to alternatively close and open port 74. The high inherent coupling strength between the two enclaves of cavity 75 is sufficient to ensure adequate dissemination of the microwave energy throughout the cavity; thus, separate input and exhaust ports for each enclave are unnecessary.

Rotor 79 is subsequently rotated to position B ($\theta = \pi/2$). The configuration of each of the enclaves when rotor 79 is in position B has an eigenfrequency of $w(B)$. This clockwise rotation is opposed by reactive electromagnetic forces generated by the microwaves contained in cavity 75, and work is applied to drive belt 111 by a driving means (not shown) in order to overcome this opposing force and achieve the aforementioned rotation. In accordance with the Boltzmann-Ehrenfest Theorm, the change in the configuration of each of the enclaves, that is, the compression, brought about by the rotation of rotor 79 from position A to position B causes the enclaves to become excited with a higher level of microwave energy $E_B$ at the corresponding increased frequency $w(B)$. While in position B, the microwaves of frequency $w(B)$ are transferred into cavity 77 by means of electromagnetic coupling through coupling port 76. This electromagnetic coupling mechanism will operate through port 76 whenever cavity 75 is excited with microwave energy at $w(B)$, that is, whenever rotor 79 is in position B. No means are necessary to alternatively close and open port 76.

The microwaves of frequency $w(B)$ in cavity 77 are subsequently transferred from cavity 77 and applied to microwave load 88 by means of coupling through waveguide 86. As shown in FIG. 4B, microwaves of frequency $w(B)$ are continuously coupled through waveguide 86 throughout the operative cycle of engine 70, although the quantitative amount of energy transferred from cavity 77 to load 88 during any discrete interval will vary. Rotor 79 is rotated clockwise back into starting position A ($\theta = \pi$) to complete the cycle. In practice, the cycle described herein is repeated very rapidly.

In order to use engine 70 to generate work from high frequency microwaves, load 88 must instead be a source of high frequency ($w(B)$) microwaves, low frequency microwave source 83 must instead be a low frequency microwave exhaust sink, and the driving means connected to rotor drive belt 111 must instead be an appropriately connected work load (not shown).

Cavity 77 is first excited with high frequency microwaves of energy $E_B$ at frequency $w(B)$ from source 88 by means of coupling through waveguide 86. Cavity 77 is continuously excited in this state by the aforementioned means during the operation of the engine in this mode.

Rotor 79 starts in position B and $\theta = \pi/2$, the position in which both of the enclaves in cavity 75 are in a configuration have high eigenfrequency $w(B)$. After exciting cavity 77, the microwaves of frequency $w(B)$ are transferred into cavity 79 by means of coupling through coupling port 76 while the rotor is in position B. The electromagnetic fields generated by the microwaves in the enclaves exert radiation pressure against rotor 79 and thereby cause it to rotate clockwise to a position corresponding to lower enclave eigenfrequency $w(A)$, that is, to position A ($\theta = \pi$). The mechanical work performed by the electromagnetic fields in forcing this rotation is applied to a load (not shown) connected by any mechanical means (not shown) to rotor drive belt 111. In accordance with the Boltzmann-Ehrenfest Theorm, the change in the enclave configurations, that is, the expansion, brought about by the rotation of rotor 79 to position A causes the energy level of the microwaves contained in the enclaves of cavity 75 to drop to a lower level $E_A$ at a corresponding lower frequency $w(A)$. While in position A, the microwaves in cavity 75 are transferred into cavity 73 by means of coupling through coupling port 74.

The microwaves in cavity 73 are subsequently exhausted into sink 83 by means of coupling through waveguide 71. The clockwise rotation of rotor 79 is continued until it is again in position B ($\theta = 3\pi/2$), thereby completing the cycle. In practice, the cycle is rapidly repeated.

The operational efficiency of the engine will be a function of the microwave energy lost through inelastic collisions between the individual photons and the walls of the cavity and thereby rendered unavailable for eventual application to an external load. This effect is termed energy decay, and is commonly expressed in terms of the amount of time, $\tau$, a cavity will remain excited at a value above a particular percentage of its original energy state. Superconducting cavity walls increase the elasticity of the photon-wall collisions, and thereby increase the decay time. However, the engine will still suffer some degree of loss from decay because even superconducting walls possess some resistance and will not reflect impacting photons with perfect elasticity.

The energy loss from decay will occur during the time, T, that the cavity is excited with microwave energy. In the cylindrical cavity and piston combination embodiment of the present invention shown in FIG. 1, T is the interval during which piston 15 is moving from $X_1$ to $X_2$ if the engine is operating to generate high frequency microwaves. If the engine is operating in the rectification mode, T is the interval required for the piston 15 to move from $X_2$ to $X_1$. Alternatively stated (and independent of the operational mode), decay will occur during the time, T, required to complete ½ of the complete mechanical cycle, or ½Ω, where Ω is the mechanical frequency of crankshaft 19 in revolutions per unit of time.

With respect to the cavity and vibrating diaphragm combination embodiment of the present invention shown in FIG. 2, T is the interval required for diaphragm 47 to move from position A into position B, or, if operating in the rectification mode, the time required for diaphragm 47 to move from position B into position A. Alternatively stated (and independent of operational mode), T = ½Ω, where Ω is the frequency of the vibration of diaphragm 47 in cycles per unit of time.

With respect to the cylindrical cavity and concentric rotor combination embodiment of the present invention, T is the time required for the concentric rotor to rotate from position A into position B (referring to FIGS. 3 and 3A and also to FIGS. 4 and 4A) or, if operating in the rectification mode, the interval required for the rotor to rotate from position B into position A. Alternatively stated (and independent of the operational mode), $$T = \frac{2\pi}{n} \times \frac{1}{2\Omega}, \qquad (1)$$

where Ω is the mechanical frequency of the concentric rotor in revolutions per unit of time and $n$ is the number of enclaves contained in the resonator (or lobes on the concentric rotor).

Thus, qualitatively speaking, the operational efficiency for each of the three embodiments of the present invention disclosed herein is directly proportional to the mechanical frequency, Ω, of engine operation. However, the analysis also indicates that the cylindrical cavity and concentric rotor combination has a unique advantage in that its operational efficiency may also be increased by increasing $n$, the number of enclaves contained in the resonator.

When operating in the region of small energy losses, that is, where $T/\tau \ll 1$, the fractional loss of microwave energy due to energy decay may be closely approximated by the expression $T/\tau$. For each watt of energy dissipated into resonator walls, approximately 1,000 watts are required for refrigeration to maintain the low temperature of the walls necessary for superconductivity. Thus the net engine efficiency $\epsilon$ may be given by the expression $$\epsilon = 1 - 10^3 T/\tau \qquad (1)$$

The decay time $\tau$ for microwave energy in a resonator with resistive losses may be expressed as $$\tau = \frac{\mu_o L_1}{2R_s} \qquad (2)$$

where $L_1$ is a size characteristic of the resonator (the volume to surface area ratio), $R_s$ is the surface resistance, and $\mu_o$ is the susceptibility of free space to magnetic fields, $$4\pi \times 10^{-7} \frac{\text{kg-meters}}{\text{coulombs}^2}.$$

The time which the microwaves spend in the resonator, T, is equal to half the time required for a mechanical cycle and may also be approximated by $$T = \frac{L_2}{2v} \qquad (3)$$

where $L_2$ is a characteristic size of the resonator and $v$ is the velocity with which one part of the resonator moves past another. Substituting the expressions for $\tau$ and T of equations (2) and (3), respectively, into equation (1), and setting $$\frac{L_2}{L_1} = \alpha, \qquad (4)$$

an expression for net engine efficiency independent of size may be obtained;

$$\epsilon = 1 - \frac{10^3 \times R_s}{\mu_o v} \alpha.$$

The basic equation for the power P that may be generated by the engine is $$P = \frac{E}{2T} \qquad (5)$$

where $E$ is the energy content of the resonator and is given by $$E = (B_c^2/2\mu_o) \times V \qquad (6)$$

where $V$ is the volume of the resonator and $B_c$ is the limiting magnetic field at the superconducting surface in webers/meters$^2$, that is, the maximum magnetic field that may be sustained at the surface of the superconducting walls without a breakdown in superconductivity. Substituting equations (6) and (3) into equation (5);

$$P = \frac{(B_c^2/2\mu_o) \times V}{L_2/V} \qquad (7)$$

Substituting the previous definition for $\alpha$ gives $$P = \frac{B_c^2 v}{2\mu_o \alpha} \times A \qquad (8)$$

where $A$ is the surface area of the resonator.

Experimental data indicate tha $R_s$, the surface resistance, should lie between $10^{-8}\Omega$ and $10^{-9}\Omega$. A rotor speed, $v$, of 300 meters/second is deemed conservative in view of the current state of the turbine art. Based upon cylindrical models, $\alpha \approx 4$. Using the aforementioned parameters and equation (4), the net efficiency, $\epsilon$, of the present invention embodied in the turbine form is estimated to lie between 90 and 99% depending on which value of surface resistance, $R_s$, is used. Assuming that an average field of 700 gauss could be sustained in the resonator, that is, $B_c = 700$ gauss $= 0.07$ webers/meters$^2$, the power density as given by equation (8) would be approximately $1 \times 10^5$ watts per square meter of resonator surface area. The present invention's estimated efficiency range is far higher than that currently achievable for either microwave generation or the conversion of microwave energy into mechanical work. To date, the highest overall efficiency demonstrated by any microwave conversion unit is approximately 50%.

The theoretical equations hereinbefore derived, the performance characteristics generated from such equations, and the various parameters upon which such characteristics are based are provided solely as an aid to the prospective user of the present invention. It is to be understood that such equations, performance characteristics, and parameters are not in any manner or form intended to define or otherwise restrict the scope or boundaries of the present invention.

Preferably, the present invention should be made out of either solid niobium or lead plated copper. Niobium has the highest critical field, but lead plated copper is easier to work with and correlates better in practice with theoretically predicted fields. Lead is plated onto oxygen free high conductivity copper, a type of high purity copper well known in the industry, from a fluoborate bath using common commercial techniques.

Figure 5:
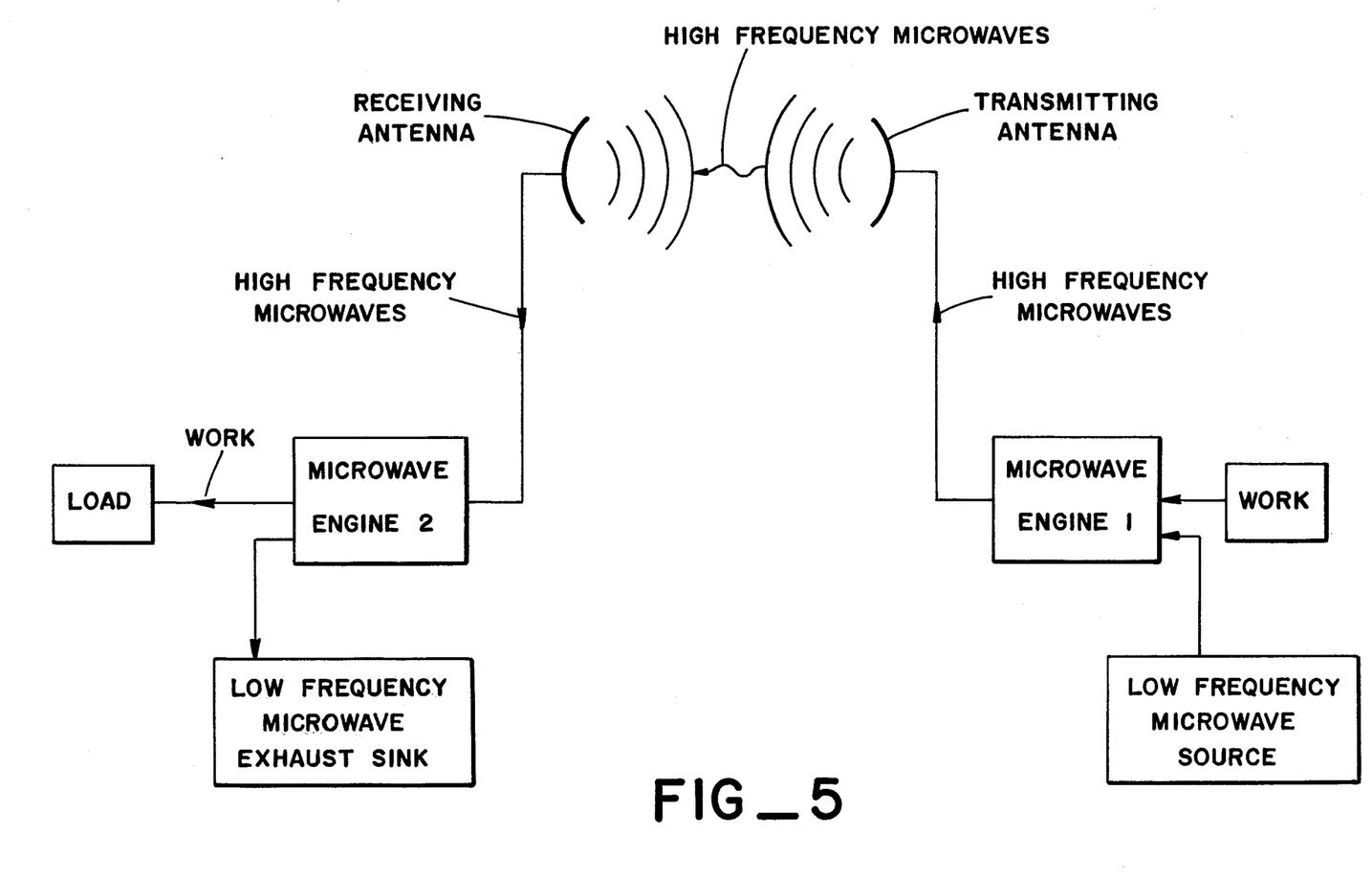
FIG. 5 is a schematic diagram demonstrating an operational use of the superconducting microwave engine of the present invention.
Figure 6:
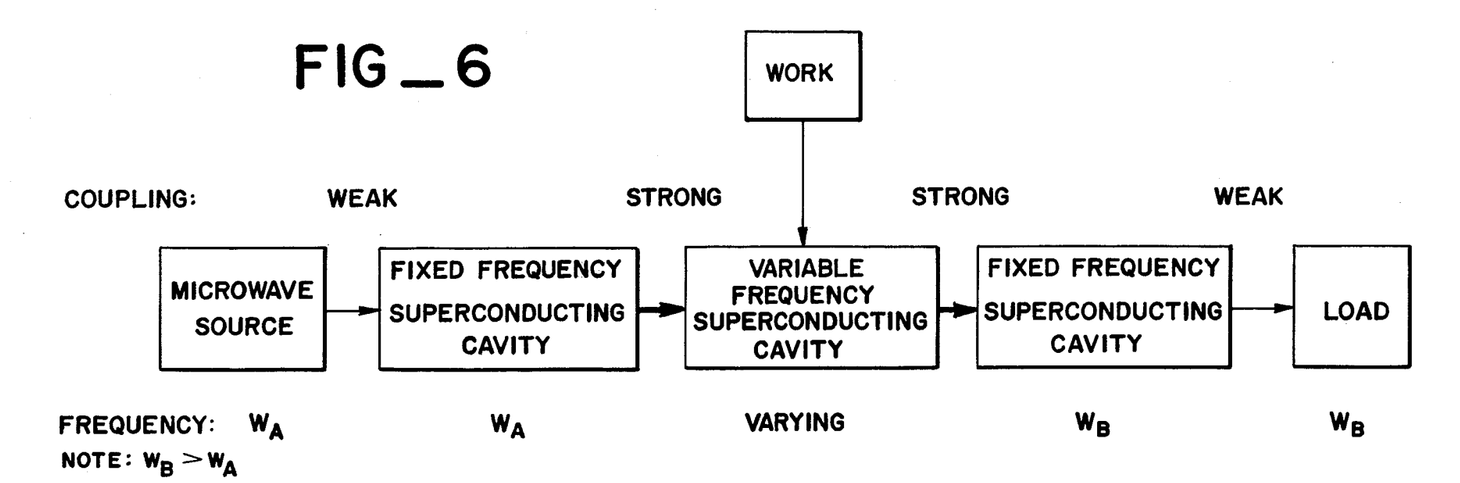
FIG. 6 schematically illustrates the operative interrelationship of the components of the vibrating diaphragm and cavity combination embodiment and the cylindrical cavity and concentric rotor combination embodiment of the superconducting microwave engine of the present invention for engine operation generating high frequency microwaves from work and low frequency microwaves.
Figure 6A:
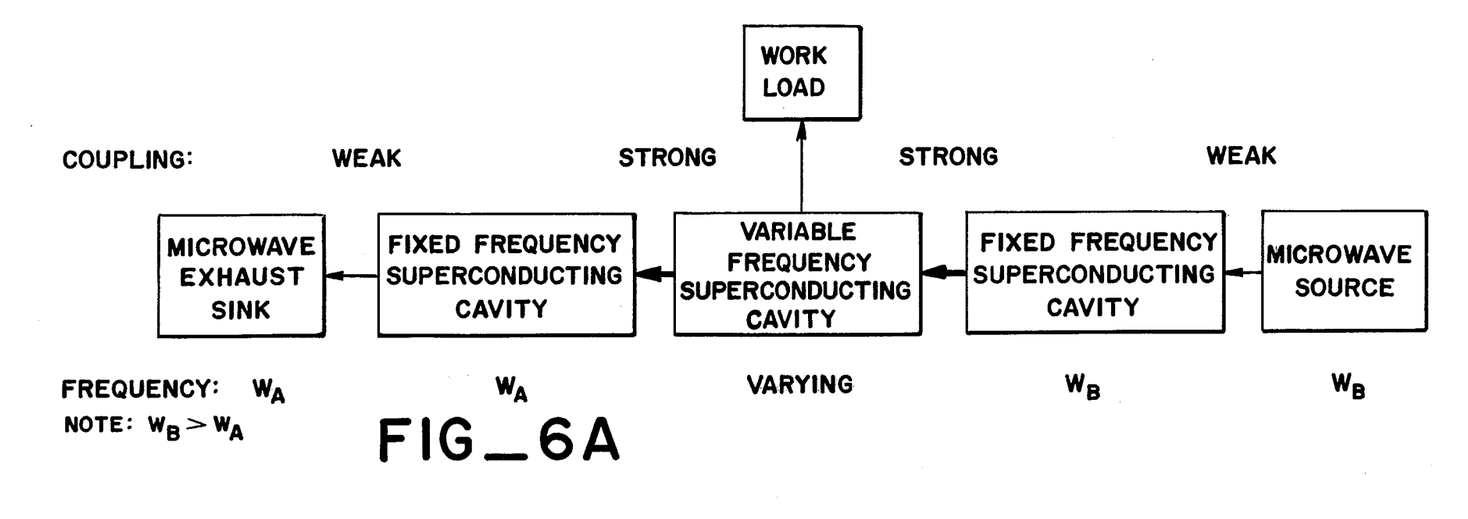
FIG. 6A schematically presents the operative interrelationship of the components of the aforementioned embodiments for engine operation in the rectification mode, that is, for generating work from high frequency microwaves.

FIG. 5 illustrates how two microwave engines may be jointly used to provide an efficient method for the transmission of useful work from one location to another.

Microwave engine 1 is operating to generate high frequency microwaves from work and input low energy microwaves. The generated high frequency microwaves are transmitted through the atmosphere to a receiving antenna at a distant location (though waveguides may also be used) where they are subsequently fed into microwave engine 2. Engine 2, operating in the rectification mode, accepts the high frequency microwaves, exhausts low frequency microwaves, and generates work for application to a load near the site of the engine.

Implementation of the invention should permit the transmission of energy in microwave form at an overall efficiency substantially higher than that currently achievable in the state of the art, at an efficiency comparable or superior to that of conventional electronic power transmission (especially as the distance separating the points of transmission and rectification increase), and to and from locations heretofore difficult if not virtually impossible to reach.

What is claimed is:

1. A method of transmitting energy in the form of microwaves comprising:
   a. converting work and microwaves having an initial energy level into microwaves having an energy level higher than said initial energy level at a superconducting temperature at a first location;
   b. transmitting said microwaves having said higher energy level from said first location to a second location;
   c. receiving said microwaves having said higher energy level at said second location; and
   d. rectifying said microwaves having said higher energy level into useful work at a superconducting temperature at said second location.

2. The method of transmitting energy in the form of microwaves of claim 1 wherein:
   a. said transmitting being transmitting through the atmosphere by means of conventional energy transmission apparatus; and
   b. said receiving being receiving by means of conventional energy reception apparatus.

3. The method of transmitting energy in the form of microwaves of claim 1 wherein said transmitting being transmitting by means of a waveguide.

4. The method of transmitting energy in the form of microwaves of claim 1 including subsequently transmitting said useful work to the site of a load by conventional means.

* * * * *